(12) United States Patent  
Marti-Sala

(10) Patent No.: US 6,457,610 B1
(45) Date of Patent: Oct. 1, 2002

(54) SILO FOR STORING AND CONTROLLED SUPPLY OF EMPTY LIGHT CONTAINERS, AND METHOD FOR USING SUCH SILO

(76) Inventor: Jaime Marti-Sala, c/ Emancipació, 8, 08017 Barcelona (ES)

( * ) Notice: Subject to any disclaimer, the term of this patent is extended or adjusted under 35 U.S.C. 154(b) by 0 days.

(21) Appl. No.: 09/762,883

(22) PCT Filed: Aug. 11, 1999

(86) PCT No.: PCT/ES99/00262

§ 371 (c)(1),
(2), (4) Date: Apr. 6, 2001

(87) PCT Pub. No.: WO00/09425

PCT Pub. Date: Feb. 24, 2000

(51) Int. Cl.[7] .................................................. B67D 5/06
(52) U.S. Cl. ............................... 222/185.1; 222/181.1; 221/130; 221/241; 198/533
(58) Field of Search ........................... 222/185.1, 181.1; 221/173, 174, 130, 241, 253; 198/533

(56) References Cited

U.S. PATENT DOCUMENTS

| 2,233,652 | A | * | 3/1941 | Ticknor et al. ............... 198/56 |
|---|---|---|---|---|
| 3,125,254 | A | | 3/1964 | Schuette, Jr. |
| 3,526,344 | A | * | 9/1970 | Koning ........................ 222/196 |
| 3,722,747 | A | * | 3/1973 | Petit ............................. 222/56 |
| 3,995,541 | A | | 12/1976 | Coyle et al. |
| RE29,385 | E | * | 9/1977 | Miksitz ......................... 222/1 |
| 4,062,527 | A | * | 12/1977 | Schmitz ....................... 366/114 |
| 5,199,612 | A | * | 4/1993 | Raque ......................... 222/134 |

FOREIGN PATENT DOCUMENTS

| DE | 24 25 508 | 12/1975 |
|---|---|---|
| EP | 0 117 457 | 9/1984 |
| FR | 2 529 175 | 12/1983 |
| GB | 620231 | 3/1949 |
| WO | WO 96 30727 | 10/1996 |

* cited by examiner

*Primary Examiner*—Lesley D. Morris
*Assistant Examiner*—Frederick C Nicolas
(74) *Attorney, Agent, or Firm*—Richardson & Folise

(57) ABSTRACT

A silo bin is adapted for receiving lightweight articles such as empty bottles. The floor of each chamber has a selectively operable shutter or aperture allowing the lightweight articles to be released into the next lowest bin such that the articles are not crushed by their own weight. The height of each chamber is predetermined so that the lightweight articles will not be damaged when piled in a heap in each chamber. A conveyor may be provided beneath the silo bin for carrying away discharged containers.

33 Claims, 5 Drawing Sheets

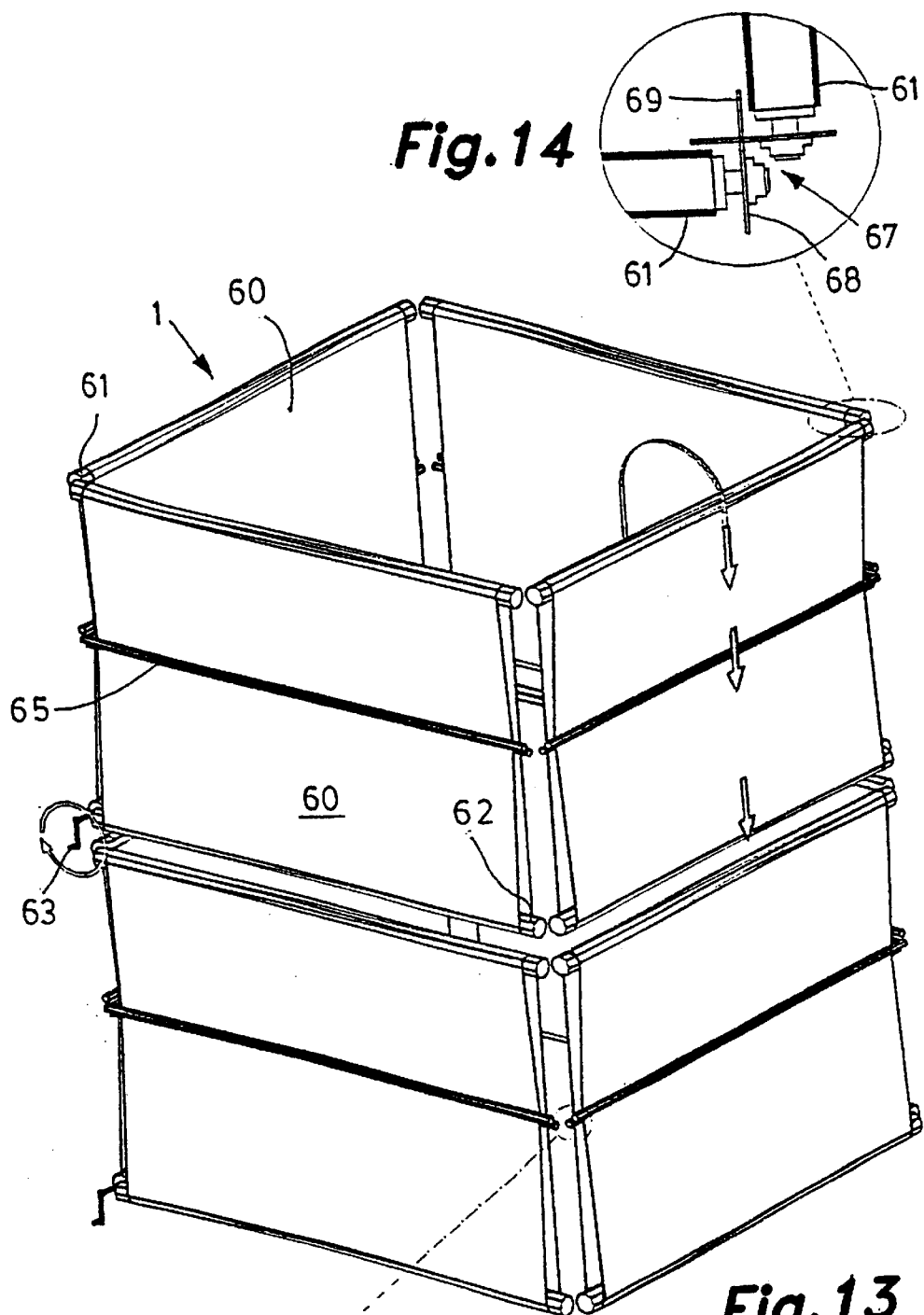
Fig.14
Fig.13
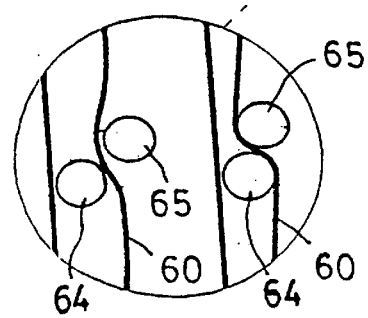
Fig.15

SILO FOR STORING AND CONTROLLED SUPPLY OF EMPTY LIGHT CONTAINERS, AND METHOD FOR USING SUCH SILO

FIELD OF THE INVENTION

The present invention concerns a silo for the storage of lightweight hollow bodies, said silo being especially conceived (although its use can be generalized to also encompass other articles) to temporarily accumulate empty containers made of plastics material prior to ulteriorly feeding them to processing lines (filling, bottling, labelling lines, and so on), said silo being of the type that is provided with a charging inlet at a high level and at a lower region with an outlet provided to discharge the containers by gravity and arranged in a superimposed arrangement above an outfeed conveyor band connecting with a corresponding ulterior line provided for the processing or handling of said containers.

When inside a silo of big capacity (for example a right parallelepipedic enclosure with a side of 4 meters and a height of 5 meters) provided at the bottom with a discharge outlet the hollow, lightweight bodies of this kind, such as thin-walled containers made of plastics material, are highly prone to form "domes" or "bridges" that impede the regular and continued flow of said bodies through the corresponding discharge outlet. This is due to the fact that said bodies, for example containers, do frequently have irregular shapes and are provided with protuberances such as handles, necks, etc. causing (particularly under the conditions of random distribution and pressure of the other superimposed containers) said bodies to mutually interlock thus forming a sort of structure that is usually called a "dome" or "bridge", said structure propping itself against the walls and thus causing a jam inside the silo thus preventing the containers involved and all those situated on top of them from descending by gravity towards the lower region of the silo.

Another limitation affecting the empty lightweight containers as regards their storage in silos of big dimensions resides in their relatively low crushing strength such as when sustaining collisions due to their free fall from an excessive height or when being submitted to the pressure exerted by the weight of a big quantity of containers piled up on top of a given container. This therefore limits the maximum height for a free fall from the upper charging inlet, as well as the maximum height for a piling up of containers inside the silo and on a bearing surface such as the bottom.

Another drawback of the above-mentioned silos, especially if they are provided for the storage of containers provided to be later on filled with liquids or beverages intended for human consumption, derives from the need to periodically clean the inside of the silo, said cleaning being a labour intensive job due to the big dimensions of these enclosures that are besides of difficult access (generally being only accessible through their top opening and through the use of lifting means or the like).

BACKGROUND OF THE INVENTION

In the prior art several devices have been proposed to solve the problem of delivering by gravity other solid, compact bulk materials such as mineral coal or gravel being prone to form domes.

Documents U.S. Pat. Nos. 2,905,365 and 3,286,886 thus disclose hoppers or devices for the delivery of bulk materials which are both formed by a bin with rigid, flat, fixed walls and with a rectangular cross-section whose surface area tapers from top to bottom, said bin being provided with an outlet at its lower end. Innerly attached to at least one of said walls is a rigid flat plate connected to means provided to impart a vibratory motion to said plate.

This arrangement has the drawback that between the rigid plate and the hopper's wall a gap is formed which tends to receive and accumulate dirt particles that hinder the operation of the device and whose removal without disassembling the unit involves a difficult cleaning operation. On the other hand, since the mechanisms provided to transmit the vibratory motion are arranged outside the hopper they must pass through the corresponding fixed wall of the latter in order to connect with the movable plate, this entailing a relative complexity of said mechanisms.

Document WO 95/03233 does moreover disclose a hopper for the delivery of bulk materials consisting in a bin of frustoconical shape whose cross-sectional surface area tapers from top to bottom, said bin being provided with an outlet at a lower end. The wall of said bin is formed by at least a rigid, fixed portion and at least a rigid, movable portion connected to means provided to generate a vibratory motion. This arrangement, although representing a certain simplification of the mechanisms as compared with those mentioned above, has the drawback that the element to be vibrated is at least a substantial portion of the main wall of the bin and has to be strong enough to withstand the pressure exerted by the material, said portion of said wall therefore having a relatively big mass and thus entailing a high energy consumption.

The devices described in the three above-mentioned documents are useful for the delivery of solid, compact bulk materials such as for example mineral coal, gravel, etc. which are not to be damaged by blows or as a result of being crushed. Such devices are nevertheless not apt to deliver in bulk lightweight hollow bodies such as containers made of plastics material, since these latter are liable to be crushed by the vibratory motion of the rigid plates or rigid portions of the bin in combination with the decreasing cross-sectional surface area of the latter, as well as by the weight of the very hollow bodies piled up on top of each other inside the silo, especially if this latter has a considerable height.

Also known in the art are devices such as deflector plates, nets with passage openings big enough for the containers, or labyrinths situated at different levels inside a tall silo, said devices being provided to limit the maximum height for a free fall of a container upon another one situated at a lower level, and the maximum height for the piling up of containers on top of a specific container in particular. Said deflector plates, nets or labyrinths are nevertheless a hindrance for the free flow of the stored articles, this then having to be added to the problem of the formation of "domes" or "bridges".

Other technical background of interest regarding the object of the invention is to be found in patents U.S. Pat. No. 5,687,881 and WO-A-96/30727, EP-A-033 815, EP-A-001576, EP-A-0336815 and U.S. Pat. No. 4,127,970.

BRIEF DESCRIPTION OF THE INVENTION

The invention provides a silo of big capacity for the temporary storage of lightweight hollow bodies, said silo being provided to be emptied by gravity and being especially apt to accumulate said containers for example coming from a container production area prior to an ulterior delivery when the necessity arises to continuously feed empty plastic containers for example to bottling lines where said containers will be submitted to different processing operations (filling, capping, labelling, etc.). It thus becomes feasible to adapt the production of the machines forming said containers, for example injection moulders, to the needs of the bottling lines during the operational cycles of these latter.

According to a first object of this invention said silo is provided with means to adjust inclines delimiting the bottom of the silo or to jolt or vibrate said bottom in order to prevent the formation of "domes" or "bridges" or to disrupt them, as the case might be.

Another object of the invention consists in a dispensing device adapted to deliver empty plastic containers to a conveyor belt with a regular and controlled flow of said containers and with the possibility of an adaptation to the characteristics of size and shape of said containers.

Another object of this invention is that of providing a silo apt for the storage of lightweight hollow bodies, especially empty plastic bottles, the walls of said silo being easily washable since they can be "transferred" to the outside thus allowing to easily have access to all parts of their surface.

Yet another object of the instant invention is that of providing a silo for the controlled storage and delivery of empty lightweight containers, said silo being provided with means to limit the maximum height for a free fall of a container upon another container situated at a lower level, and the maximum height for the piling up of containers on top of a specific container in particular inside the silo.

Finally another object of the present invention is that of providing a method for the controlled storage and delivery of empty lightweight containers by means of a silo provided with the means mentioned in the two paragraphs above.

According to an exemplary embodiment of the present invention related with the last mentioned object a silo is provided for the controlled storage and delivery of empty lightweight containers, said silo being of the type that comprises an amply dimensioned bin provided with a charging inlet at its upper region and with a bottom with at least a controllable discharge outlet at its lower region, said bin being filled and emptied by gravity. In order to limit the maximum height for a free fall of a container upon another container situated at a lower level, as well as the maximum height for the piling up of containers on top of a specific container in particular, said silo comprises a division of said bin into mutually superimposed enclosures that are apt to be filled by gravity and whose height is a function of the type of container to be stored, said enclosures being delimited by retractable supporting floors provided with independent driving means apt to shift them in order to thus open or close at least a passage therethrough for the discharge of containers from an enclosure into the next lower enclosure.

In a preferred exemplary embodiment said supporting floor comprises at least a flexible sheet such as a canvas apt to be wound up around a rotary reel supported next to one of the lateral walls of said bin, a frontal free edge of said flexible sheet being attached to a loadbearing bar apt to be shifted away from and towards said rotary reel thereby being supported and guided along a predetermined track formed, for example, by a pair of lateral rails supporting corresponding wheels or runners fitted to both ends of said loadbearing bar. Said predetermined track, being preferably horizontal, comprises retractable stops that prevent the loadbearing bar from being shifted backwards when the flexible sheet is in the extended condition.

The loadbearing bar is provided with pushing means comprising a pair of articulated arms each of which is formed by two sections that are linked to each other, each arm being linked at an end to the framing, at a location near the rotary reel, and at the other end to the loadbearing bar, each of said arms including an extension spring attached at one end to one of said sections and connected by means of a flexible element to the other of said sections thus imparting to said sections a tendency to spread up and to thus adopt a mutually aligned position thus pushing said loadbearing bar away from said rotary reel. An electric motor drives said rotary reel in favour of or against said pushing means to respectively extend and withdraw said flexible sheet.

The silo of the present invention does optionally comprise lateral walls formed by linens of flexible sheet provided with reinforced peripheral edges and attached to a supporting frame by means of stretchers distributed along said edges. By way of stiffeners for said lateral walls extended cables are arranged across the outer surface of said linens and are attached by means of tighteners to said supporting frame.

In order to facilitate the manufacture, transportation and assembly of said silo taking into account its big dimensions, each of said supporting floors is associated to a portion of the framework of said bin thus forming a modular assembly apt to be fitted in a stacked arrangement on top of a base module to thus form a bin of a desired height, said base module including said bottom and discharge outlet, said modular assemblies being attached to each other and to the base module at the final location by means of detachable or permanent connections.

Irrespective of the type of embodiment chosen for the supporting floors, in the silo as per the present invention detecting means have been besides provided to detect the level of containers having accumulated on the supporting floor and/or on the bottom. In response to signals received from said detecting means control means are apt to act on at least said supporting floor driving means so as to control the flow of containers from one enclosure into another and the maximum quantities of said containers in each enclosure. Said control means are optionally integrated into a general control system governing the feeding into said silo and the controlled delivery of containers from this latter onto, for example, a packaging line.

The precited silo is operated by following the method for the controlled storage and delivery of empty lightweight containers hereinafter described, said method also being an object of the present invention.

With a silo such as that described above whose bin is divided into mutually superimposed enclosures by means of retractable supporting floors, said enclosures being upperly filled by gravity, said supporting floors,being provided with independent means apt to at a desired point in time selectively communicate with each other two of the aforesaid enclosures, and the height of said enclosures being adapted to the minimum value of the maximum free fall height or the maximum heaping up height a predetermined type of container can withstand with no damage, said method is characterized in that:

when starting to feed said bin this is always done by means of first charging the highest enclosure, and with this latter isolated from the next following one;

any enclosure is always discharged by means of communicating it with the next lower enclosure, with this latter being at least in part empty as well as isolated with respect to the next following one, except when the next lower enclosure is that situated at the lowest level and inferiorly delimited by said bottom and said controllable discharge outlet, in which case said discharge outlet can be:

closed, in order to store containers; or open up to a selected extent for a controlled delivery of said containers.

BRIEF DESCRIPTION OF THE DRAWINGS

These and other characteristics will be best made apparent by the following detailed description of an embodiment cited only by way of a merely illustrative and nonlimiting example with reference to the accompanying drawings, wherein.

Figure 2:
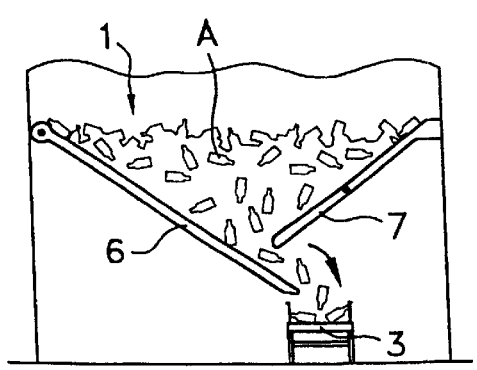
Figure 3:
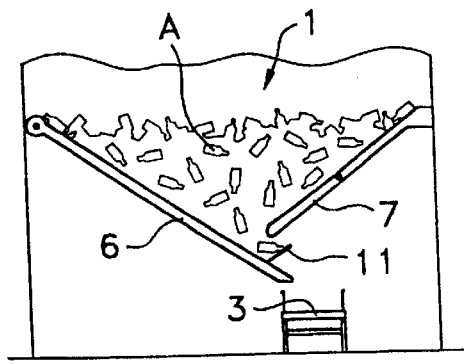
Figure 4:
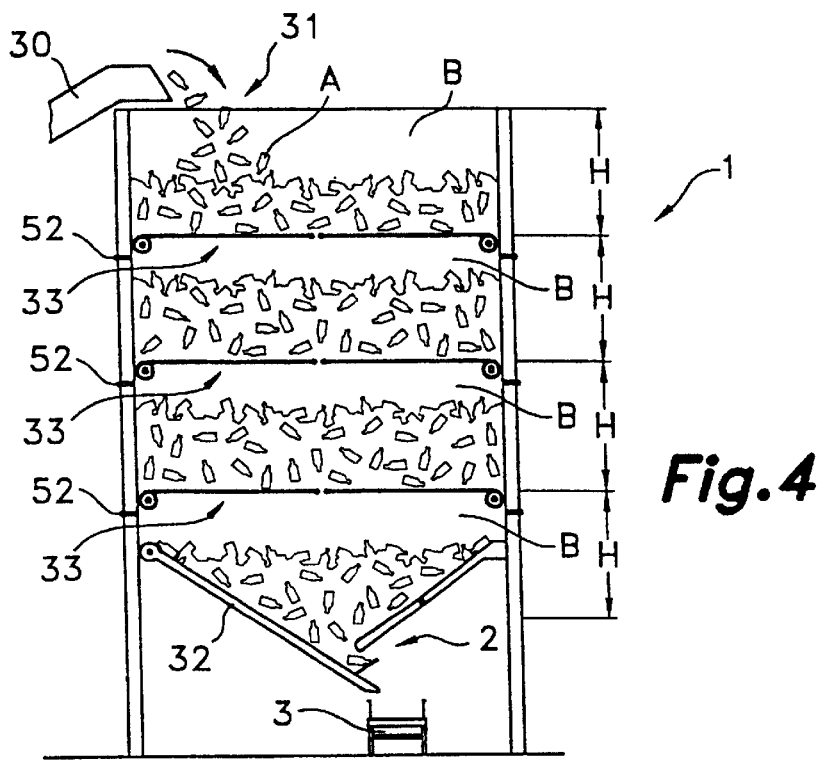
Figure 5:
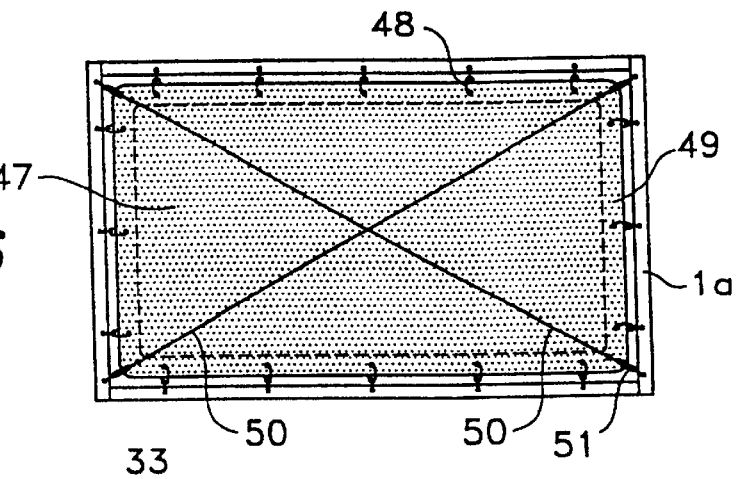
Figure 6:
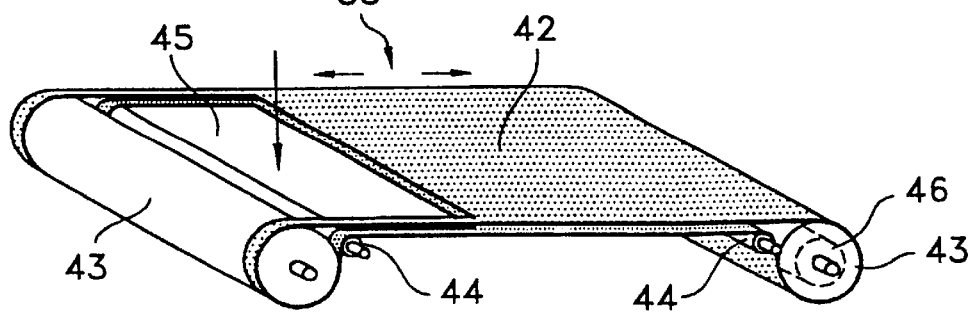
Figure 7:
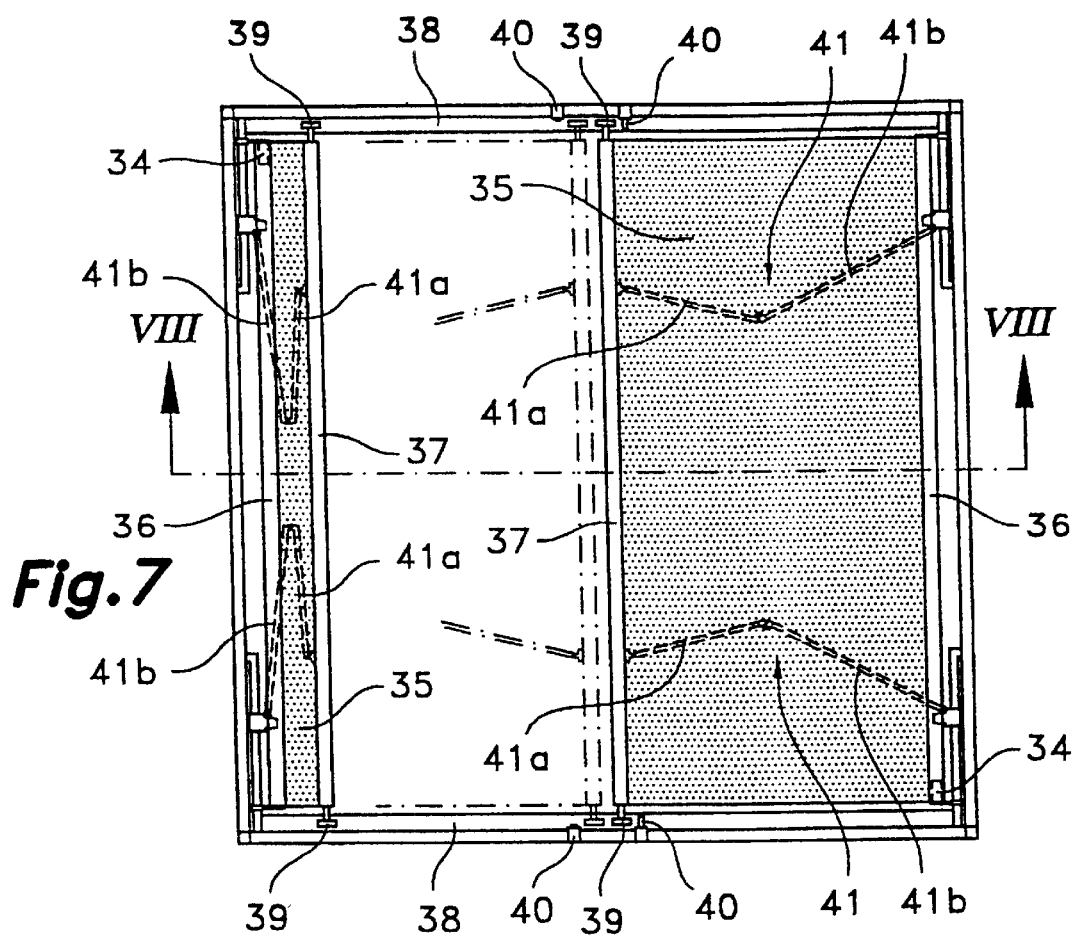
Figure 8:
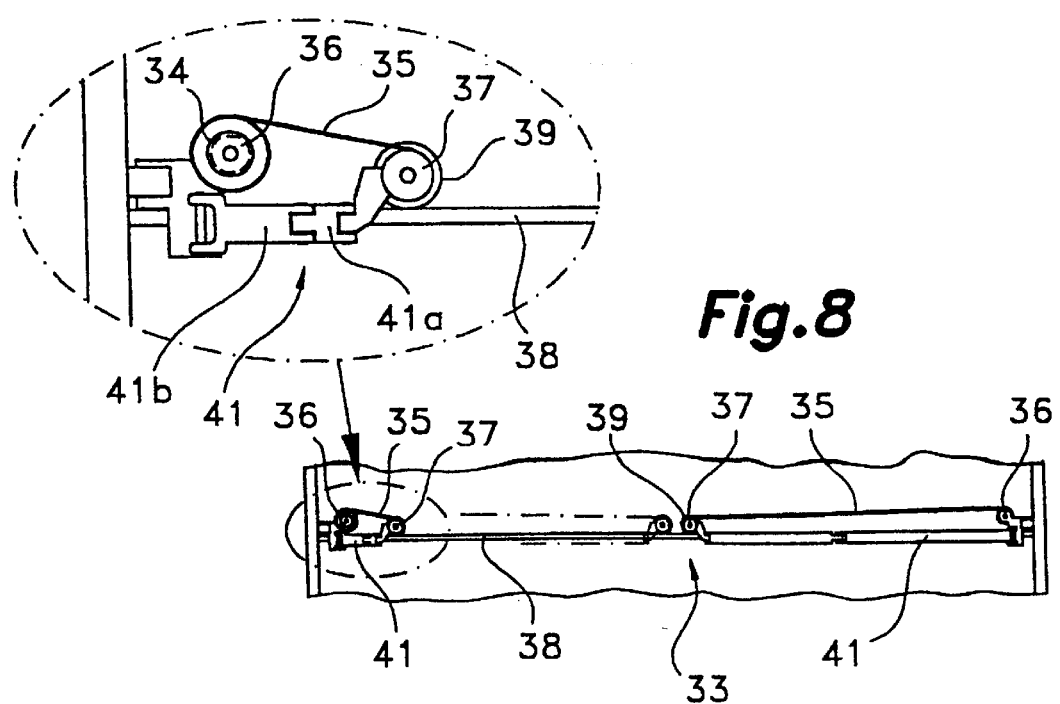

Each of FIGS. 2 and 3 is a schematic elevation illustrating the operation of the dispensing device characterizing this invention;

FIG. 4 is a vertically sectional view of a silo as per the invention at a stage where the complete filling with empty lightweight containers for their temporary storage is being concluded, with the lower outlet closed by means of a movable flap;

FIG. 5 is an exterior elevational view of a lateral wall of a portion of the silo of FIG. 4;

FIG. 6 is a perspective view of an alternative exemplary embodiment of a supporting floor for a silo such as that of FIG. 4;

FIG. 7 is a top view of a preferred exemplary embodiment of a supporting floor of the silo of FIG. 4;

FIG. 8 is a cross-section as per line VIII—VIII of FIG. 7 with an enlarged detail;

FIGS. 9 through 12 are schematic side views of the silo of FIG. 4 illustrating a possible sequence to be employed for filling/emptying said silo for a controlled delivery of empty lightweight containers;

FIG. 13 is a simplified perspective view of a silo built as per the principles of the instant invention;

FIG. 14 is an enlarged detail illustrating the means employed to support the silo walls and to seal off the corners of said silo; and FIG. 15 is another enlarged detail illustrating means employed to tighten linens defining said walls of the silo.

DETAILED DESCRIPTION OF PREFERRED EXEMPLARY EMBODIMENTS

According to the aforementioned drawings the proposed silo comprises an amply dimensioned bin 1 provided at a high level with an inlet for charging said silo in bulk with lightweight hollow bodies such as empty plastic containers A, and with a gravitational discharge outlet at a lower region fitted with a dispensing device generally designated by reference numeral 5, said device being arranged in a superimposed arrangement above an outfeed conveyor band 3 connecting with a corresponding ulterior line provided for the processing or handling of said hollow bodies.

Figure 1:
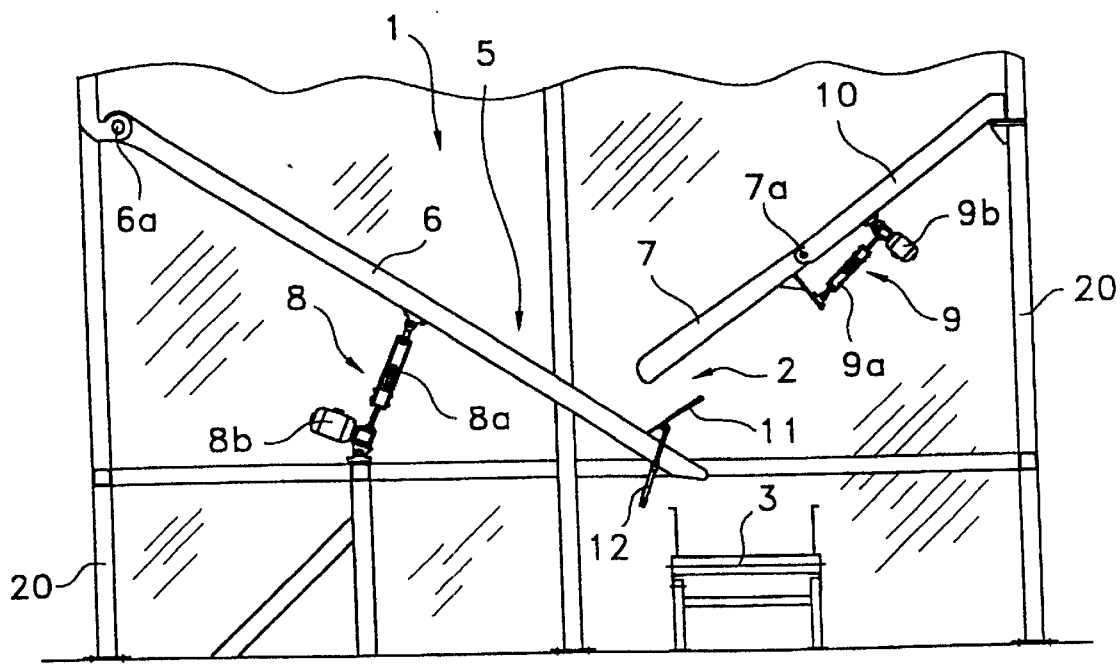
FIG. 1 is an elevational, partial view showing the lower region of the proposed silo having been fitted with the proposed dispensing device.

According to the invention the dispensing device 5 comprises a first plate 6 and a second plate 7 which are respectively linked in a hinged connection to opposite walls of the precited bin 1 through a horizontal pin 6a, 7a along one of their sides, said plates 6, 7 being arranged on a descending slant with respect to their hinged connection 6a, 7a and with opposite slants, the first plate 6 extending in part underneath the free edge of the second plate 7, said plates 6, 7 being apt to be brought into a mutually overlapping arrangement at their distal end portions situated away from the hinged connection thus closing the bottom of said bin 1, and/or to be mutually separated thus delimiting said discharge outlet 2 of a given width preselected in accordance with the size and/or shape of the containers A. As can be seen in FIGS. 1 and 3 plates 6, 7 are associated to continuously or joltingly actuating pushing means 8, 9 allowing to simultaneously and coordinately tip said plates to thus give them different slants thereby maintaining during their shifts the precited passage width of the discharge outlet 2.

The silo comprises a fixed framework 20 made of rigid members forming frames delimiting a space in the shape of a rectangular parallelepiped supporting said dispensing device 5.

Each of the aforementioned pushing means 8, 9 allowing to adjust the inclination of said plates 6, 7 comprises its own driving unit associated to each of said plates 6, 7. In the embodiment illustrated in the drawings each of said own driving units forming the pushing means 8, 9 comprises a screw-and-nut drive 8a, 9a driven by an electric motor 8b, 9b, said driving units being respectively associated to each of said plates 6, 7 and being also controllable in an independent manner. It is to be pointed out that the unit would be equally operative with another type of automatically or even manually governed mechanical drive.

As shown by FIG. 1, the second plate 7 is linked through said hinged connection pin 7a to the overhanging edge of a downwardly slanted, fixed wall 10 forming a first ramp solidly attached to said framework 20 supporting the assembly.

The precited first plate 6 is provided with a flap 11 that is fitted in the vicinity of its free end, is linked at one of its sides to said first plate 6, and is associated to its own pushing means 12 thus being apt to adopt a preselected slanted position thus rising up to a bigger or lesser extent thus being in a position to form a wall retaining the containers A, as shown in FIG. 3, in opposition to the outlet 2 for the discharge of said containers. This facilitates the closing of the discharge outlet of the silo without having to alter the slants of said bottom plates 6 and 7.

In a preferred embodiment said flap 11 is oblong and has a thin profile and is fitted to the upper surface of a portion adjacent to the free edge of the first plate 6 distally situated away from the hinged connection 6a, said portion being provided with openings for the passage of fluid-operated cylinders forming said pushing means 12 and linked to said first plate 6.

The inclination of the first and second plates 6, 7 and that of flap 11, as well as the eventual jolting of one or more of them, will preferably be governed from a central control unit as per a programmed sequence adapted to the supply needs.

FIG. 4 of the drawings shows a silo as per an alternative embodiment of the present invention comprising an amply dimensioned bin 1 upperly provided with a charging inlet 31 and provided at its lower region with a bottom 32 with at least a controllable discharge outlet 2. Partially and schematically are also shown an elevator unit 30 for upperly charging empty lightweight containers A into said silo, and a conveyor band 3 situated directly below the discharge outlet 2 for receiving and conveying the containers delivered by the silo towards, for example, a packaging line (not shown).

Said bin 1 does innerly comprise a division into mutually superimposed enclosures B that are apt to be filled by gravity, the height H of said enclosures B being a function of the type of container A to be stored, this bringing about a limitation of the maximum free fall height and the maximum crushing pressure sustained by a container A situated at a lower level. Said enclosures are delimited by retractable supporting floors 33 provided with independent driving means 34, 36 apt to shift them to thus open or close at least a passage therethrough for the discharge of containers A from an enclosure into the next lower enclosure, excepting the enclosure situated at the lowest level which is delimited by the bottom 32 and the discharge outlet 2.

FIGS. 7 and 8 show a preferred embodiment of a supporting floor 33 that is derived from an already classic system used in the awning manufacturing field and into which some simplifications and modifications have been incorporated thus rendering its implementation very favourable from the financial standpoint. Said supporting floor does in effect comprise two flexible sheets 35 that are made of a material such as a canvas and are each apt to be respectively wound up around a rotary reel 36, said rotary reels being supported at opposite locations next to opposite lateral walls of said bin 1. A frontal free edge of each flexible sheet 35 is attached to a loadbearing bar 37 apt to be shifted away from and towards said rotary reel 36 thereby being supported and guided along a predetermined track. Said supported and guided track is one of the characteristics specifically contributed by this embodiment and differentiating it from the classical application in the awning field, and is formed by a pair of lateral rails 38 supporting corresponding wheels 39 or runners fitted to both ends of said loadbearing bar 37. Said rails 38 are preferably horizontal, so that both flexible sheets are when extended coplanar, retractable stops 40 having been provided in said predetermined track to prevent the loadbearing bar 37 from being shifted backwards when the flexible sheet 35 is in the extended condition. In order to better explain the operation in FIGS. 7 and 8 one of said flexible sheets 35 is shown in an essentially retracted position (on the left-hand side with its extended position indicated by dash-and-dot lines), whereas the other flexible sheet 35 is shown in its totally extended position (on the right-hand side). Nevertheless, both flexible sheets 35 will usually be extended or retracted in unison.

Said flexible sheets 35 are actuated as follows: Pushing means push said loadbearing bars 37 away from the respective rotary reels 36, i.e. towards a central area of the supporting floor 33. On their side, the aforementioned driving means 34 typically consisting in an electric motor housed inside each rotary reel 36 act in favour of and against the corresponding pushing means in order to respectively extend and withdraw said flexible sheets 35.

The precited pushing means comprise for each flexible sheet 35 a pair of articulated arms 41 each of which is formed by two sections 41a, 41b that are linked to each other, each arm 41 being linked at an end to the framing, at a location near the rotary reel 36, and. at the other end to the loadbearing bar 37, each of said arms 41 including an extension spring attached at one end to one of said sections 41a, 41b and connected by means of a flexible element to the other of said sections 41a, 41b thus imparting to said sections 41a, 41b a tendency to spread up and to thus adopt a mutually aligned position, whereas the driving means 34 act directly on said rotary reel 36.

FIG. 6 shows an alternative exemplary embodiment for said supporting floor 33 comprising at least a flexible endless band 42 extended between two rollers 43 supported at respective opposite locations next to opposite lateral walls of said bin 1, said band being also pressed by a pair of bearing rollers 44 thus forming two mutually superimposed and very close sheet sides, said flexible band 42 comprising a portion provided with a wide and long opening 45, driving means 46 having been provided in such a way that they are connected to reciprocatingly rotate at least one of the rollers 43 thereby causing said flexible band 4 to be apt to adopt a position wherein the whole opening 45 is located in the lower sheet side and the upper sheet side forms a supporting floor closing the upper enclosure, and at least a position wherein a portion of said opening is situated in the upper sheet side and superimposed on another portion of said opening 45 situated in the lower sheet side thus facilitating a passage therethrough for the discharge of containers A from an enclosure into the next lower enclosure (the position illustrated in FIG. 6). This exemplary embodiment can also be preferably implemented with two of said bands 42 arranged in an adjacent and coplanar relationship for each supporting floor 33.

FIG. 5 shows one of the lateral walls of the silo, said wall being formed by a linen 47 made of a sheet of a flexible material attached by means of stretchers 48 distributed along its reinforced peripheral edges 49 to a supporting frame 1a.

According to an alternative arrangement of the invention the silo is also characterized in that each of the supporting floors 33 described above is associated to a portion of the framework of said bin 1 (see again FIG. 4) thus forming a stackable modular assembly allowing to form a bin 1 of a desired height on top of a base module including said bottom 32 and said discharge outlet 2, the modular assemblies being attached to each other and to the base module at the final location by means of detachable or permanent connections 52.

The silo of the invention does besides comprise means to detect the level of containers A accumulated on the supporting floor 33 and/or on the bottom 32, and control means apt to act on at least said driving means 34, 36 provided to drive the supporting floors 33 dividing said enclosures B in response to signals received from said detecting means. Said control means are integrated into a general control system governing the feeding of said silo and the controlled delivery of containers A from this latter.

Figure 9:
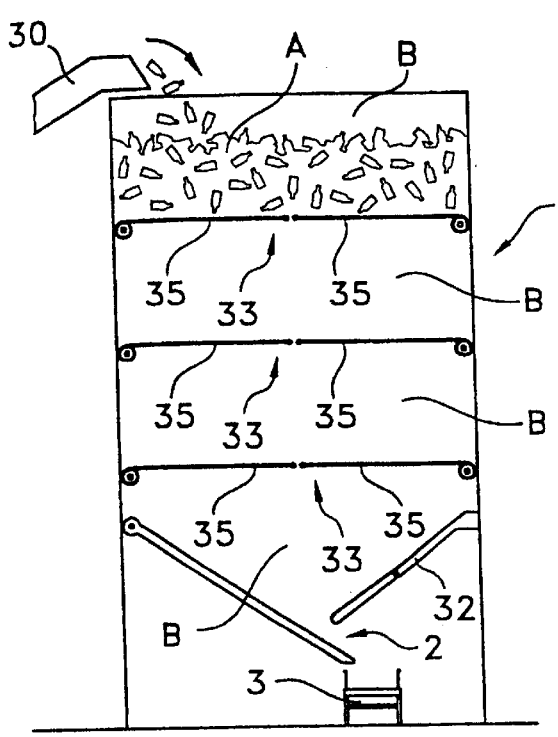
Figure 10:
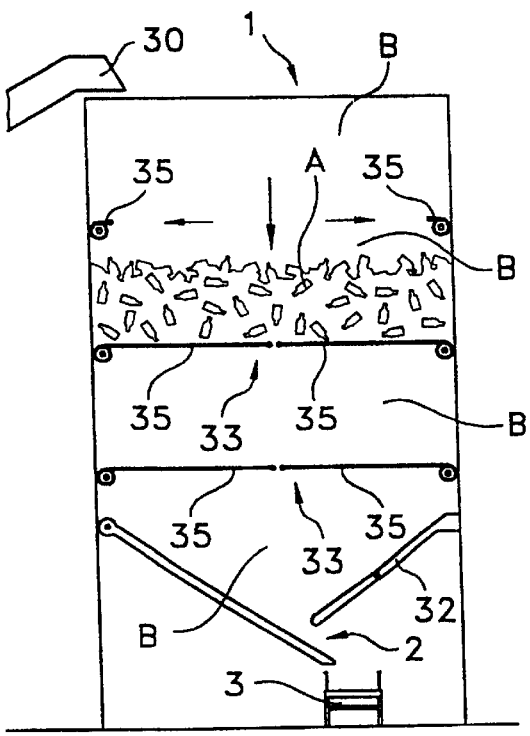
Figure 11:
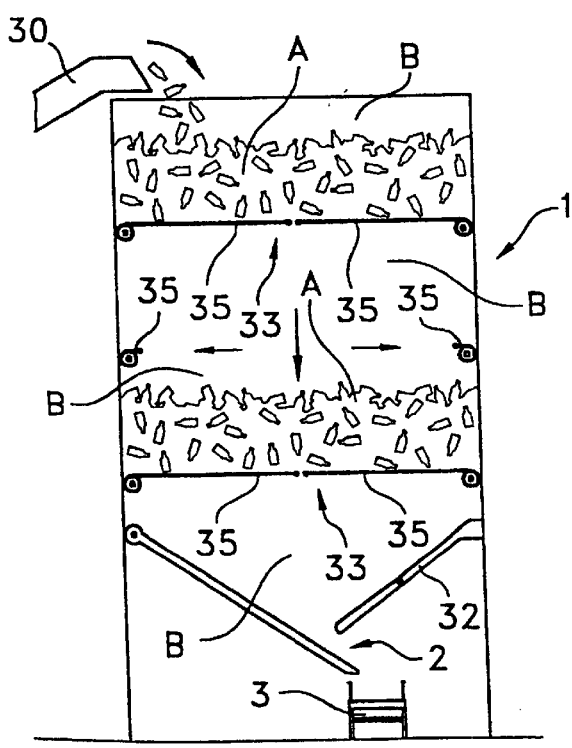
Figure 12:
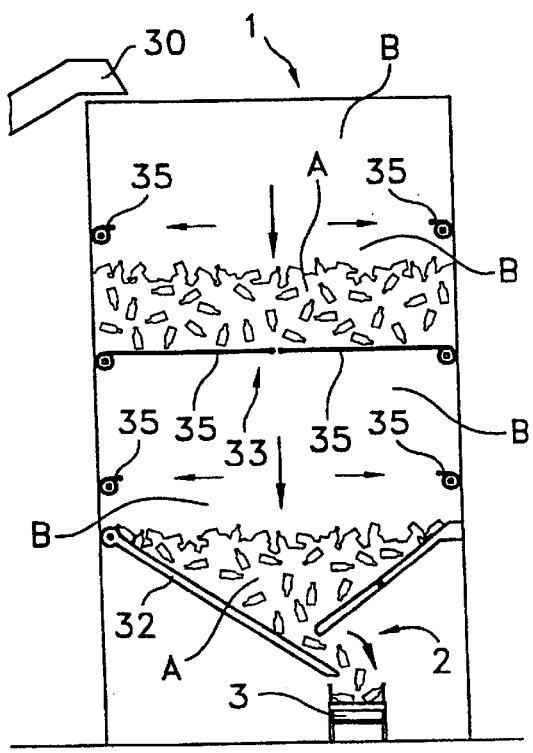

FIGS. 9 through 12 illustrate the method for the controlled storage and delivery of empty lightweight containers A as per the invention by using a silo such as that described in FIGS. 4 through 8; said method being characterized in that it operates by means of actuating the supporting floors 33 in such a way that in no case a container A will fall freely from a height bigger than the height H of the enclosures, or a container A will have on top of it a height of piled up containers bigger than said height H of the enclosures. As has been set forth above, the height H of said enclosures B has been defined so as to be adapted to the minimum value of the maximum free fall height or to the maximum heaping up height a predetermined type of container A can withstand without being damaged. An exemplary logical sequence for the process of filling up and emptying said silo for a controlled delivery of empty lightweight containers A is as follows:

a) said bin 1 is initially fed by means of charging the enclosure situated at the highest level, with said enclosure being isolated with respect to the next following one (FIG. 9);

b) when or before having filled the enclosure situated at the highest level the flexible sheets 35 are actuated in order to withdraw the supporting floor 33 (FIG. 10) thus communicating said enclosure situated at the highest level with the next lower enclosure and thus discharging the containers A; it being a prerequisite for discharging any enclosure that the next lower enclosure be at least in part empty and isolated from the next following one, except when the next lower enclosure is the enclosure situated at the lowest level;

c) if there are more than two superimposed enclosures B the discharge of a given enclosure onto the next lower enclosure and the charging or discharging of an enclosure situated at a higher level can be carried out at the same time (see FIG. 11) provided that the prerequisite mentioned in paragraph b) is met;

d) this procedure is sequentially repeated in a downward direction till when the next lower enclosure is the enclosure situated at the lowest level (FIG. 12), said enclosure being inferiorly delimited by said bottom 32 and said controllable discharge outlet 2, in which case there are two alternatives:

if the silo is to be used for a temporary storage of containers A e1) said discharge outlet 2 is closed (FIG. 4) thus allowing to completely fill up the enclosure situated at the lowest level;

f1) thereupon the flexible sheets 35 of the supporting floor 33 of the next higher enclosure are closed in order to fill it up completely, and so on in an upward direction till having filled all of the enclosures (FIG. 4) or a desired number of enclosures; or if the silo is to be used for a controlled delivery of containers A e2) said discharge outlet 2 is open (FIG. 12) up to an extent selected in accordance with the required flow of containers; and f2) steps a)–d) are thereupon repeated in a continued way and at such a rate as is adequate to deliver said required flow of containers through the discharge outlet 2, said rate possibly being automatically controlled on the basis of signals received from sensing means detecting the filling level in each enclosure.

According to the exemplary embodiment of FIGS. 13 through 15 the proposed silo comprises an amply dimensioned bin 1 provided with a discharge outlet at a lower region and upperly open, said bin being laterally delimited by sheet walls 60 made of a flexible material.

Each of said sheet walls 60 comprises an endless linen such as for example a strong canvas tightly extended around a pair of parallel drums 61, 62 situated at different upper and lower levels, said linen being apt to be moved by means of a pulling device 63 associated to one 61 of the drums, said pulling device being advantageously associated to that drum of each pair that is situated at the lower level whereas the second, idle drum 62 acts as a guide drum. Said pulling device 63 can be manually operated (such as the device shown, i.e. a removable crooked handle), or else it can be a motor-driven device.

Each sheet wall 60 has besides associated to it at middle height a pair of rollers 64, 65 between which said endless linen extends in a nipped arrangement, one 65 of said rollers, namely the one situated outside, being apt to be shifted to thus turn while being applied against the internal roller 64 in order to thus conveniently tighten said linen.

In the example illustrated in the drawing the silo comprises four sheet walls 60 delimiting a quadrangular, right parallelepipedic enclosure provided at the corners with supporting members 67 formed by pillar sections with two panels arranged in a crosswise arrangement, the flanges 68 of the external dihedron of said sections providing a support for the ends of the drums 61, 62 and rollers 64, 65, the inner, orthogonal flanges 69 configuring a corner that seals off the gap between the linens.

The silo could have another cross-section, for example pentagonal or of more sides, thereby retaining all of the performance characteristics set forth above, although a rectangular section will be adopted when dividing the silo into several floors.

In order to prevent jams due to the above-mentioned phenomenon of the formation of "domes" or "bridges" it has been foreseen to connect one or more of said sheet walls 60 to a vibrating or jolting mechanism such as for example a compressed-air cylinder or a pusher cam governed from a control centre through at least a connection point between said mechanism and the wall. From said control centre it will be possible to also govern the extent up to which the sheet wall is to be tensioned by the vibrating means.

In an alternative embodiment not having been illustrated it has been foreseen to build the silo by means of a fixed framework made of rigid members forming frames delimiting a space having the shape of a parallelepiped supporting a dispensing device providing said discharge outlet, said framework made of rigid members besides supporting said drums 61, 62 and rollers 64, 65 on which said sheet walls extend.

In this case said sheet walls 60 will cover the spaces delimited by each frame, with the drums 61, 62 arranged at the top and bottom sides of said frames.

The exemplary embodiments and modes of operation described above intend to have a merely illustrative and nonlimiting character, an expert ordinarily skilled in the art being in a position to introduce numerous changes or modifications both into the silo and the method for its operation without thereby departing from the scope of the invention as defined by the appended claims.

What is claimed is:

1. A controllable discharge silo apparatus for the storage of lightweight hollow bodies, the apparatus comprising:

a bin (1) provided with a charging inlet (31) and a bottom (32) having a discharge outlet (2) operable to be used in a superimposed arrangement above an outfeed conveyor band (3);

a dispensing device (5) having first and second plates (6 & 7) having respective sides connected to opposite walls of said bin (1) by respective hinges (6a, 7a), plates (6, 7) being arranged on a descending slant with respect to a hinges (6a, 7a) and with opposite slants, the first plate (6) extending at least in part under a free edge of the second plate (7), said plates (6, 7) being operable to be brought into a mutually overlapping arrangement at a distal end portions to close the bottom of said bin (1), and/or to be mutually separated to define a passage width of said discharge outlet (2) in accordance with a size and/or shape of the bodies (A); and pushing means (8, 9) cooperating with said plates (6, 7) to simultaneously, continuously or joltingly coordinately tip said plates (6, 7) to give them different slope inclinations while maintaining a passage width of the discharge outlet (2).

2. The controllable discharge silo apparatus of claim 1, further comprising a fixed framework (20) comprised of rigid members (21) forming frames (22) delimiting a space in the shape of a rectangular parallelepiped supporting said dispensing device (5).

3. The controllable discharge silo apparatus of claim 2, wherein said second plate (7) is linked by its respective hinge (7a) to an overhanging edge of a downwardly slanted, fixed wall (10) solidly attached to said framework (20) supporting the assembly.

4. The controllable discharge silo apparatus of claim 1, wherein said pushing means (8, 9) comprises separate driving units associated with respective said plates (6, 7).

5. The controllable discharge silo apparatus of claim 4, wherein each of said driving units comprises a screw-and-nut drive (8a, 9a) each of which is independently controllable by an electric motor (8b, 9b).

6. The controllable discharge silo apparatus of claim 1, wherein at least the said first plate (6) is provided with a flap (11) that is fitted in the vicinity of the free end of the plate and is linked at one of its sides to said first plate (6), and is associated with its own pushing means (12) to permit it to adopt a preselected slanted position rising up to a greater or lesser extent to form a wall retaining the bodies (A), in opposition to the outlet (2) for controlling the discharge of said bodies.

7. The controllable discharge silo apparatus of claim 6, wherein said flap (11) is oblong and has a thin profile and is fitted to the upper surface of a portion adjacent to the free edge of the first plate (6) distally from the hinge (6a), said portion being provided with openings for the passage of fluid-operated cylinders forming said pushing means (12) that are linked to said first plate (6).

8. The controllable discharge silo apparatus of claim 1, wherein the inclination of the first and second plates (6, 7) and that of flap (11), as well as the eventual jolting of one, are governed from a central control unit in accordance with a programmed sequence.

9. The controllable discharge silo apparatus of claim 1, further comprising means to prevent damage to the bodies (A) due to collisions caused by a free fall from an excessive height and/or to a crushing of said bodies caused by an excessive heaping up of these latter, said means comprising a division of said bin (1) into mutually superimposed enclosures (B) that are operable to be upperly filled by gravity, a height (H) of said enclosures (B) being a function of body (A) to be stored, to effect a limitation on a maximum free fall height and a maximum crushing pressure sustained by a body (A) situated at a lower level, said enclosures (B) being delimited by retractable supporting floors (33) provided with independent driving means (34, 36) operable to shift them to thus open or close at least a passage therethrough for the discharge of bodies (A) from an enclosure into a next lower enclosure, except the enclosure situated at the lowest level which is delimited by the bottom (32) and the discharge outlet (2).

10. The controllable discharge silo apparatus of claim 9, wherein at least one of said supporting floors (33) comprises at least a flexible sheet (35) operable to be wound around a rotary reel (36) supported next to one of lateral walls of said bin (1), a frontal free edge of said flexible sheet (35) being attached to a loadbearing bar (37) operable to be shifted away from and towards said rotary reel (36) thereby being supported and guided along a predetermined track.

11. The controllable discharge silo apparatus of claim 10, wherein said predetermined track comprises retractable stops (40) that prevent the loadbearing bar (37) from being shifted backwards when the flexible sheet (35) is extended.

12. The controllable discharge silo apparatus of claim 11, wherein at least one of said supporting floors (33) comprises pushing means that push said loadbearing bar (37) away from the rotary reel (36), and wherein said driving means (34) acts in favour of and against said pushing means in order to respectively extend and withdraw said flexible sheet (35).

13. The controllable discharge silo apparatus of claim 11, wherein at least one of said supporting floors (33) comprises pushing means that push said loadbearing bar (37) towards the rotary reel (36), said driving means (34) acting against and in favour of said pushing means in order to respectively extend and withdraw said flexible sheet (35).

14. The controllable discharge silo apparatus of claim 12, wherein said pushing means comprise a pair of articulated arms (41) each of which is formed by two sections (41a, 41b) that are linked to each other, each arm (41) being linked at one end to the framework, at a location near the rotary reel (36), and at the other end to the loadbearing bar (37), each of said arms (41) including an extension spring attached at one end to one of said sections (41a, 41b) and connected by means of a flexible element to an other of said sections (41a, 41b) thus imparting to said sections (41a, 41b) a tendency to spread and adopt a mutually aligned position.

15. The controllable discharge silo apparatus of claim 10, wherein said predetermined track comprises a pair of directly opposite rails (38) supporting corresponding wheels (39) fitted to both ends of said loadbearing bar (37).

16. The controllable discharge silo apparatus of claim 15, wherein said rails (38) are horizontal.

17. The controllable discharge silo apparatus of claim 10, wherein said supporting floor (33) comprises two of said flexible sheets (35), and corresponding rotary reels (36) being supported at respective opposite locations next to opposite lateral walls of said bin (1), and corresponding predetermined tracks arranged in such a way that the respective loadbearing bar, (37) is in a mutually adjacent arrangement when said flexible sheets (35) are fully extended.

18. The controllable discharge silo apparatus of claim 9, wherein at least one of said supporting floors (33) comprises a flexible endless band (42) extended between two rollers (43) supported at respective opposite locations next to opposite lateral walls of said bin (1), said band being pressed by a pair of bearing rollers (44) to form two mutually superimposed and very close sheet sides, said flexible band (42) comprising a portion provided with a wide and long opening (45), driving means (46) operable to reciprocatingly rotate at least one of the rollers (43) thereby causing said flexible band (42) to be operable to adopt at least a position wherein a portion of said opening is situated in the upper sheet side and superimposed on another portion of said opening (45) situated in a lower sheet side thus facilitating a passage therethrough for a discharge of bodies (A) from the enclosure into a next lower enclosure.

19. The controllable discharge silo apparatus of claim 9, further comprising lateral walls formed by linens (47) made of a flexible sheet and attached by means of stretchers (48) distributed along reinforced peripheral edges (49) to a supporting frame (1a).

20. The controllable discharge silo apparatus of claim 19, wherein said walls further comprise stiffeners comprising cables (50) extending across an outer surface of said linens (47) and attached by means of tighteners (51) to said supporting frame (Ia).

21. The controllable discharge silo apparatus of claim 9, wherein each of said supporting floors (33) is associated with a portion of a framework of said bin (1) thus forming a plurality of stackable modular assemblies forming said bin (1), such that said bin has a desired height on top of a base module including said bottom (32) and said discharge outlet (2), the modular assemblies being attachable to each other and to the base module at the final location by means of detachable or permanent connections (52).

22. The controllable discharge silo apparatus of claim 9, further comprising means for detecting a level of bodies (A) accumulated on one of said supporting floors (33) and/or on the bottom (32), and control means operable to act on at least said driving means (34, 36) provided to drive the supporting floors (33) dividing said enclosures (B) in response to signals received from said detecting means.

23. The controllable discharge silo apparatus of claim 22, wherein said control means are integrated into a general control system governing a feeding of said silo and controlled delivery of bodies (A) from the silo.

24. The controllable discharge silo apparatus of claim 1, wherein at least a high region of the bin (1) situated above the region occupied by said discharge outlet is laterally delimited by sheet walls (60) made of a flexible material.

25. The controllable discharge silo apparatus of claim 24, wherein each of said sheet walls (60) comprises an endless linen extending around first and second parallel drums (61, 62) situated at different upper and lower levels, said linen being operable to be moved by means of a pulling device associated with the first drum (61), the second drum (62) being an idler and acting as a guide drum.

26. The controllable discharge silo apparatus of claim 25, wherein each sheet wall (60) has connected to itself at middle height a pair of rollers (64, 65) between which said endless linen extends in a nipped arrangement, one (65) of said rollers, namely an outside situated one, being operable to be shifted to turn while being applied against an internal roller (64) in order to conveniently tighten said linen.

27. The controllable discharge silo apparatus of claim 24, wherein said apparatus has a polygonal cross-section, and has supporting members (67) at regions of juxtaposition of the flexible sheet walls (60), the supporting members (67) being formed by pillar sections of cross-shaped cross-section, flanges (68) of an external dihedron of said sections providing support for ends of drums (61, 62) and rollers (64, 65), an wherein inner, orthogonal flanges (69) configure a corner that seals off and protects a gap between the linens.

28. The controllable discharge silo apparatus of claim 24, further comprising four sheet walls (60) delimiting a quadrangular, right parallelepipedic enclosure.

29. The controllable discharge silo apparatus of claim 24, wherein at least one of said sheet walls (60) is connected to a vibrating mechanism through at least a connection point.

30. The controllable discharge silo apparatus of claim 29, wherein said vibrating mechanism is governed from a control centre that can also control extent to which the sheet wall (60) actuated by said mechanism is tensioned.

31. The controllable discharge silo apparatus of claim 26, wherein said bin comprises a fixed framework made of rigid members forming frames delimiting a space having a parallelepiped shape supporting a dispensing device providing said discharge outlet (2), said framework being made of rigid members supporting said drums (61, 62) and rollers (64, 65) on which said sheet walls extend.

32. The controllable discharge silo of claim 31, wherein said sheet walls (60) cover spaces delimited by each frame.

33. A method for the controlled storage and delivery of empty lightweight bodies (A) by means of a silo comprising a bin (1) provided with a charging inlet (31) at an upper region thereof and a bottom (32) at a lower region thereof, said bottom (32) having a controllable discharge outlet (2) said bin (1) being divided into mutually superimposed enclosures (B) being upperly filled by gravity, and having supporting floors and independent means operable to selectively communicate with each of said enclosures (B), a height (H) of said enclosures (B) being adapted to the minimum value of a maximum free fall height or a maximum heaping up height of a predetermined body (A) can withstand with no damage, the method comprising:

feeding said bin (1) by charging an enclosure situated at a highest level and isolated with respect to a next lower enclosure;

discharging an upper enclosure into said next lower enclosure isolated with respect to a subsequent next lowest enclosure, by placing it in communication with said next lower enclosure, except when said next lower enclosure is situated at a lowest level and delimited by said bottom (32) and said controllable discharge outlet (2), and;

operating said controllable discharge outlet to a selected extent to store said bodies (A) or to provide for a controlled delivery of said bodies (A) respectively.

* * * * *

UNITED STATES PATENT AND TRADEMARK OFFICE
CERTIFICATE OF CORRECTION

PATENT NO.    : 6,457,610 B1                                          Page 1 of 1
DATED         : October 1, 2002
INVENTOR(S)   : Jaime Marti-Sala It is certified that error appears in the above-identified patent and that said Letters Patent is hereby corrected as shown below:

Column 10,
Line 35, delete the word "a" before the word "hinges".
Line 38, delete the word "a" before the word "distal".

Column 13,
Line 22, delete the word "an" before the word "wherein" and substitute therefor the word -- and --.
Line 32, insert the word -- an -- before the word "extent".

Column 14,
Line 17, delete the word "the" after the phrase "being adapted to" and substitute therefor -- a --.

Signed and Sealed this

Eleventh Day of March, 2003

JAMES E. ROGAN
*Director of the United States Patent and Trademark Office*